United States Patent [19]
Stone

[11] 3,805,588

[45] Apr. 23, 1974

[54] APPARATUS FOR PRODUCING OUTPUT TEST SIGNALS FOR TESTING AIRCRAFT INSTRUMENT LANDING SYSTEM AND NAVIGATION EQUIPMENT

[76] Inventor: Neil Stone, 2702 Norseman Dr., Smyrna, Ga. 30080

[22] Filed: Nov. 30, 1972

[21] Appl. No.: 310,944

Related U.S. Application Data
[62] Division of Ser. No. 55,726, July 17, 1970.

[52] U.S. Cl. .................................. 73/1 E, 73/178 T
[51] Int. Cl. .............................................. G01c 17/38
[58] Field of Search ............ 73/1 E, 178 T; 343/108; 331/55, 142, 110, 49, 51; 307/261; 328/127

[56] References Cited
UNITED STATES PATENTS

| | | | |
|---|---|---|---|
| 3,159,793 | 12/1964 | Welsh | 307/261 |
| 3,051,912 | 8/1962 | Kaashoek et al. | 330/124 |
| 3,245,001 | 4/1966 | Babber | 331/55 |
| 3,340,476 | 9/1967 | Thomas et al. | 307/261 |
| 3,541,351 | 11/1970 | Mansson | 307/261 |

Primary Examiner—Donald O. Woodiel
Attorney, Agent, or Firm—Mason, Fenwick & Lawrence

[57] ABSTRACT

A signal generator for producing two sine wave signals of different frequencies, particularly for testing aircraft Instrument Landing System equipment, and maintaining the two signals in selected frequency and phase relationship. Two T oscillators are provided, which in some embodiments are of the free running type and in another are of the locked type, and control signals of a frequency having a selected relationship to the frequencies of the two signals to be generated are used to maintain the T oscillators locked in the selected relationship to each other.

6 Claims, 7 Drawing Figures

APPARATUS FOR PRODUCING OUTPUT TEST SIGNALS FOR TESTING AIRCRAFT INSTRUMENT LANDING SYSTEM AND NAVIGATION EQUIPMENT

This application is a division of my earlier copenidng application Ser. No. 55,726, filed July 17, 1970.

BACKGROUND AND OBJECTS OF THE INVENTION

The present invention relates in general to a signal generator assembly for producing a pair of sine wave signals of two selected different frequencies which are locked in timed relation to each other so as to maintain a constant time relationship between the two signals, and more particularly to a signal generator for producing a pair of relatively locked sine wave signals, for example of 90 cycle per second and 150 cycle per second frequencies or other appropriate frequencies. for use in testing Instrument Landing System navigation equipment for aircraft to provide simulated localizer and glide slope signals.

Aircraft Instrument Landing System or I. L. S. navigation equipment of a common type employs a first or localizer needle and a second or glide slope needle respectively pivoted adjacent the bottom and one side of the I. L. S. indicator. The first or localizer needle normally extends vertically upwardly through the center of the indicator, and the second or glide slope needle extends laterally from one side through the center of the indicator when the aircraft is exactly on course. The localizer needle is positioned by the electrical output of a localizer receiver activated by localizer signals transmitted from the ground, for example localizer signals of 90 cycles per second and 150 cycles per second providing a vertical plane extending along the extended longitudinal center axis of the runway where the signal strengths of the 90 cycle and 150 cycle localizer signals are equal. The glide slope needle is similarly positioned by the electrical output of a glide slope receiver activated by glide slope signals of the same two frequencies defining the desired glide path transmitted on a different RF frequency. The present invention provides a test signal generator which is particularly useful in generating test signals for testing the proper functioning of the localizer receiver and/or the glide slope receiver prior to commencing an actual or simulated I.L.S. approach. Problems have arisen in trying to develop test equipment for testing the localizer receiver of the I.L.S. navigation equipment, in that variations in one of the signals where two independent oscillators were used, produce undesirable heterodyning effects causing oscillation of the needle in the I. L. S. indicator. For example, if the portion of the test generator circuit producing the 90 cycle signal wandered to 93 cycles per second, and the 150 cycle signals remain the same, undesirable hetrodyning effects would be produced causing the needle to oscillate.

An object of the present invention is the provision of a signal generator which produces substantially sine wave signals of two different frequencies and maintains a constant time relationship between them. This is accomplished in one example by starting with a master signal produced by a master oscillator at a lower frequency common to the two frequencies to be produced, for example using a 30 cycle master signal, producing trigger pulses from it, and applying them to free running "T" oscillators having resonant frequencies of 90 and 150 cycles to produce the desired outputs. In another example, a master signal at a frequency considerably higher than either of the two output frequencies to be generated, such as for example a 900 cycle square wave signal, is divided by 10 and by 6 and fed to a triggered "T" oscillator which has a resonant frequency of 90 cycles per second, and also to another triggered "T" oscillator having a resonant frequency of 150 cycles per second. By selection of a different starting common frequency and different resonant frequencies for the "T" oscillators, other relatively locked sine wave signals of selected frequencies can be produced for whatever purpose is desired, such as for use in electronic musical instruments where specific notes are required to have proportional frequencies relationships.

Other objects, advantages and capabilities of the present invention will become apparent from the following detailed description, taken in conjunction with the accompanying drawings illustrating preferred embodiments of the invention.

BRIEF DESCRIPTION OF PREFERRED EMBODIMENTS

Figure 1:
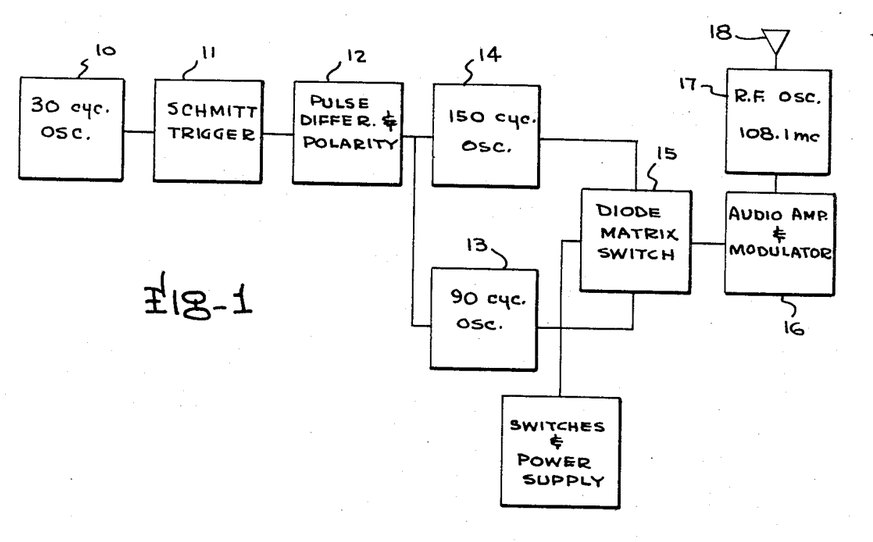
FIG. 1 is a block diagram of an I.L.S. localizer test device circuit embodying the present invention.

The apparatus of the present invention is designed and intended for use in testing for the proper functioning of the localizer receiver of an aircraft I. L. S. navigation system prior to commencing an actual or simulated I. L. S. approach. Some electronic devices such as used to generate aircraft I. L. S. signals for actual use or testing require that two independent or different signals of constant frequency be combined and that these two signals maintain their relative frequency ratios. Referring to FIG. 1, illustrating a block diagram of apparatus embodying the present invention, the problem of providing the two independent test signals maintained with a constant time relationship between each other is solved by first generating a signal which is a common factor of the signals to be locked to a definite relationship. This signal is then injected in pulse form into free running "T" oscillators operating on or near the desired frequencies. The result is that the free running "T" oscillators will lock to the master oscillator producing the common factor signals and still maintain the desired frequencies rather than any other frequencies. In one example, it is desired to maintain a constant time relationship between a 90 cycle per second signal and a 150 cycle per second signal. A common frequency to both is 30 cycles per second. The relationship is such that the factor is of an odd nature rather than an even nature, and therefore conventional synchronizing techniques cannot be used. The 30 cycle signal is one-fifth the frequency of the 150 cycle signal to be produced and is one-third of the 90 cycle signal to be produced, and is the closest frequency which is common to both. Therefore, in the block diagram circuit of FIG. 1, a master oscillator generally indicated at 10 is provided to generate the desired 30 cycle per second signal. This 30 cycle oscillator 10 may be a free running "T" oscillator, a phase shift oscillator, a free running multivibrator, or may be any other type of reliable 30 cycle per second signal source. The 30 cycle per second signal provided at the output of the oscillator 10 is coupled to a Schmitt trigger 11 to provide a fast rise waveform, although this stage would not be necessary if a free running multivibrator or other fast rise pulse at the desired master frequency is made available by the oscillator 10. The fast rise pulse produced at the output of the Schmitt trigger 11 is then coupled to a pulse differentiating and polarity determining stage 12, by coupling the square wave pulse from the Schmitt trigger 11 through a network which shortens its duration. The network provides two pulses, one positive and one negative in nature, and these are coupled to a diode in the stage 12 to eliminate one or the other pulse. The pulses of selected polarity provided at the output of the stage 12, which occur once for each three of the 90 cycle signal to be produced and once for each five of the 150 cycle per second signals to be produced, provide the synchronizing signals for the 90 cycle and 150 cycle oscillators. The 90 cycle per second oscillator 13 and the 150 cycle per second oscillator 14 are both preferably free running "T" oscillators and are locked to the master oscillator 10 by application of the selected polarity pulses produced by the output of stage 12 to maintain the desired constant time relationship between the signals produced by the two oscillators 13 and 14. The output from the two locked free running "T" oscillators 13 and 14 are coupled through an attenuating network and switching diodes, indicated collectively at 15, to an audio amplifier and modulator, indicated collectively at 16, to modulate a radio frequency oscillator 17 and provide the desired radio frequency output to be radiated through antenna 18.

Figure 2:
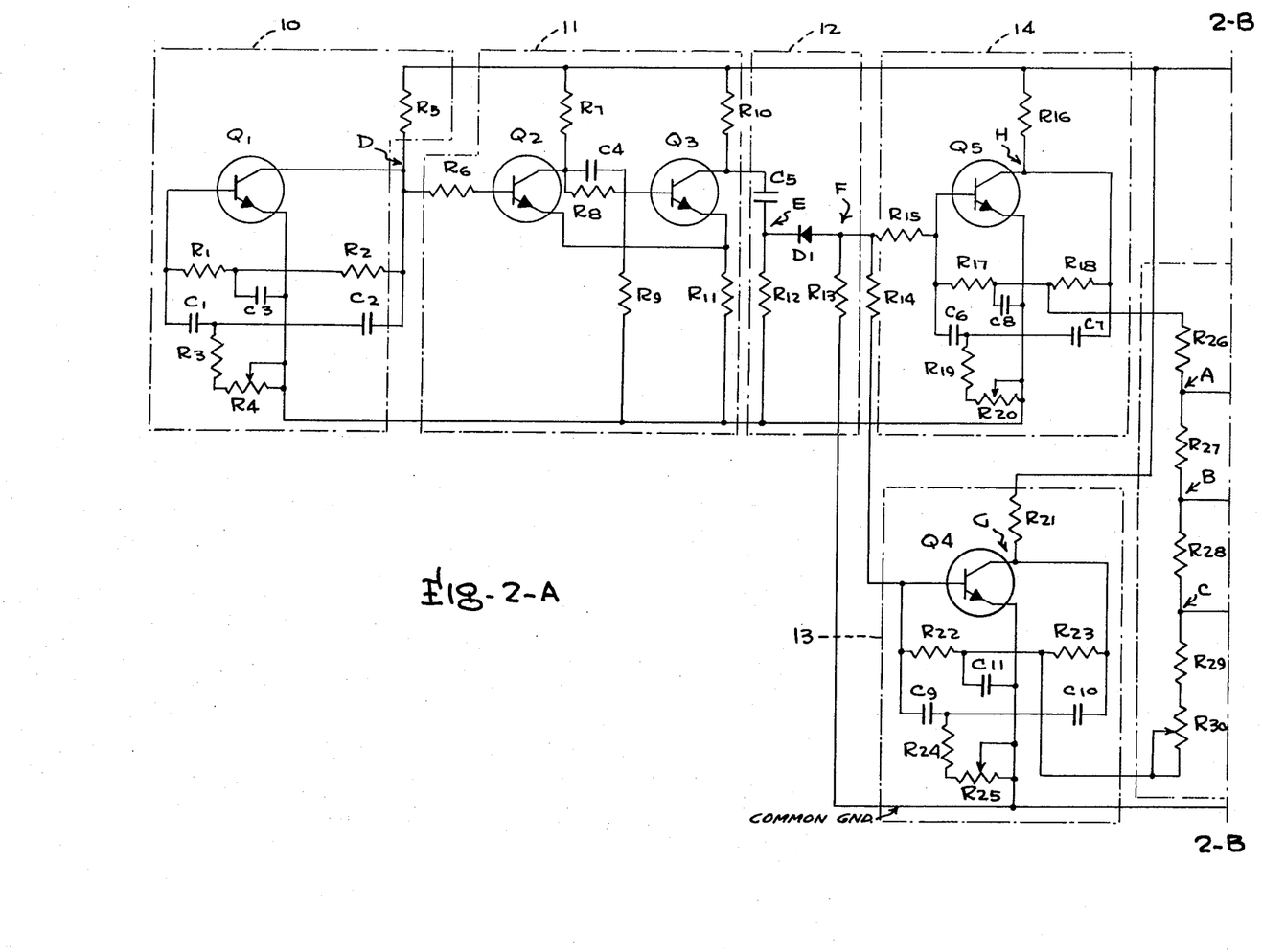
FIGS. 2A and 2B collectively form a schematic diagram of the circuit for the I.L.S. localizer test device.
Figures 2, 2B:
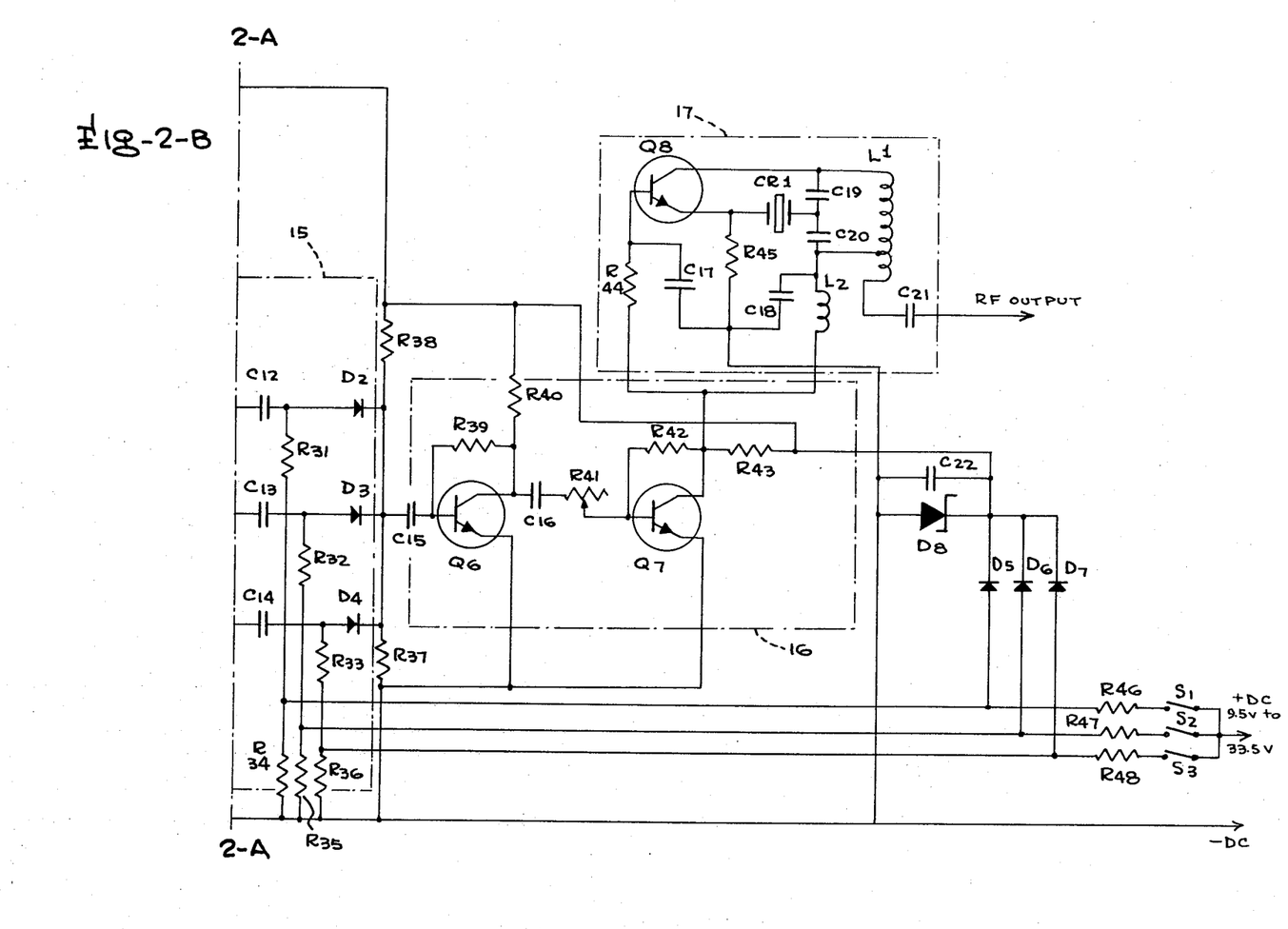

Referring now to FIGS. 2A and 2B which collectively provide a schematic circuit diagram for an example of the signal generator assembly of FIG. 1, the transistor Q1 and the associated resistors R1, R2, R3, R4, and R5 and capacitors C1, C2 and C3 provide the "T" oscillator circuit 10 generating the 30 cycle per second master signal, the circuit being adjusted by the potentiometer R4 to operate at the 30 cycle per second frequency. This 30 cycle per second output is coupled through resistor R6 to the Schmitt trigger stage 11 formed of transistors Q2 and Q3 and their associated resistors R7, R8, R9, R10, R11 and capacitor C4. The resultant square wave pulse produced at the collector of transistor Q3 is coupled through capacitor C5 to the top of resistor R12, the capacitor C5 combining with resistor R12 to convert the squared pulse from the collector of transistor Q3 into a differentiated pulse which has its polarity determined by the diode D1, with resistor R13 providing an identical DC voltage to the anode of D1 as the DC voltage of the cathode. This master 30 cycle per second trigger signal provided by the pulse differentiating network formed by C5 and R12 and the polarity determining diode D1 is then applied through resistors R14 and R15 to the 90 cycle per second oscillator 13 and the 150 cycle per second oscillator 14, locking them to the master 30 cycle oscillator. This is to maintain these 90 and 150 cycle per second signals produced by these oscillators 13 and 14 in a constant time relationship, to prevent the indicating needle of the aircraft I. L. S. indicator from oscillating due to the hetrodyning effect and phase changes which would occur when the 90 cycle and 150 cycle per second oscillators would change frequency relationships if allowed to run free.

The 90 cycle "T" oscillator 13 is formed by the transistor Q4 and its associated resistors R21, R22, R23, R24 and potentiometer R25, and capacitors C9, C10 and C11. Similarly, the 150 cycle "T" oscillator 14 is formed by the transistor Q5 and the resistors R16, and R17, R18, R19, and potentiometer R20 and capacitors C6, C7 and C8. The output from the 90 cycle oscillator 13 taken from the end of resistor R23 nearest resistor R22, and the output of the 150 cycle oscillator 14 taken from the end of resistor R18 nearest resistor R17, are applied to opposite ends of the attenuating network formed of resistors R26, R27, R28, R29 and potentiometer R30 provided to determine how much of the 90 cycle of 150 cycle signal should be provided to the switching diodes D2, D3 and D4 through the coupling capacitors C12, C13 and C14. Resistors R37 and R38 form a dividing network to establish the DC voltage on the cathodes of switching diodes D2, D3 and D4. A positive voltage is supplied in excess of the cathode voltage to the anodes of switching diodes D2, D3 and D4 through resistors R31, R32 and R33, causing the appropriate diode to conduct and thus selecting which ratio of 90 cycle and 150 cycle signal is to be presented to the transistor Q6 of the audio amplifier 16 through coupling capacitor C15. Resistors R34, R35 and R36 place the anodes of the other diodes at a common ground potential, so that they do not conduct and therefore block their respective signals.

Transistor Q6 and its associated resistors R39 and R40 form an audio amplifier with the output coupled to the modulator formed by transistor Q7 through capacitors C16 and potentiometer R41. The adjustable potentiometer R41 determines the modulation level and the total course needle deflection.

Transistors Q7 and its associated resistors R42 and R43 provide a varying voltage to the transistor Q8 of the RF oscillator stage 17, thus modulating it. The transistor Q8 with its associated resistors R44 and R45, its capacitors C17, C18, C19, C20 and C21, and coils L1 and L2, and the fifth overtone crystal CR1, form an overtone oscillator 17 on 108.1 Mc designed to operate over a wide range of input voltages and provide a linear output. The coil L2 provides R. F. filtering. Resistor R45 is a balance of DC resistance and a small amount of inductance and so should not be substituted by a carbon type or other wire wound resistor.

The power supply is formed by Zener diode D8 which provides regulated 7.5 volts to the unit. Capacitor C22 bypasses any audio components present in the DC line. Diodes D5, D6 and D7 provide isolation from the desired DC input source to the other non-operating leads, and resistors R46, R47 and R48 serve as dropping resistors for the zener diode D8. The switches S1, S2 and S3 connected between the resistors R46, R47 and R48 and the DC supply control which of the switching diodes D2, D3 and D4 will be allowed to conduct and apply their respective signals to the audio amplifier transistor Q6. When any of the switches S1, S2 or S3 are open, their associated respective diodes D2, D3 and D4 will not conduct, and thus those switching diodes which are not conducting wwll block their respective signals. The diode D2 provides the switching diode for applying the 150 cycles signal from the upper tap point A of the attenuating network R26–R30, indicating left of course, the switching diode D3 connects from the point B on the attenuating network providing a balance of 150 cycle and 90 cycle signal and thus indicating the center or on course position, and the diode D4 connects to the lower connection point C of the attenuating network providing a predominant 90 cycle signal indicating to the right of center.

Figure 3:
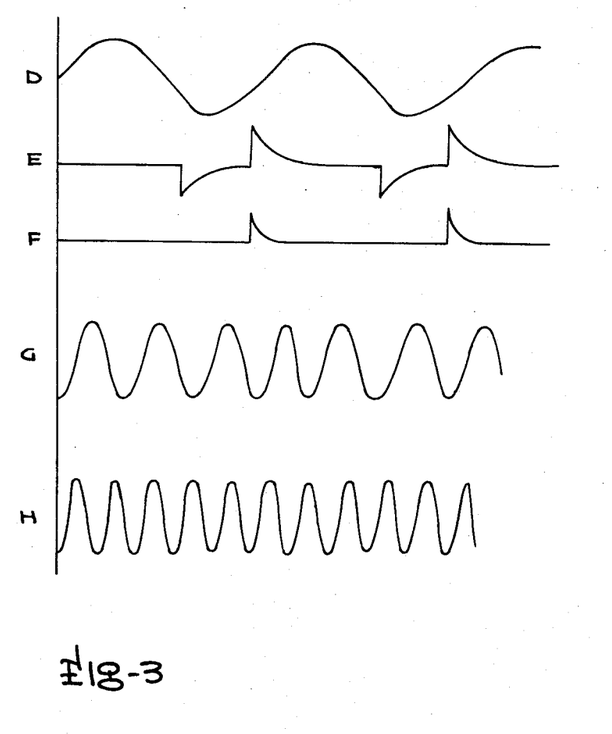
FIG. 3 is an illustration of representative wave forms produced at selected points through the circuit of FIG. 2.

Representative wave forms produced at selected points in the circuit are illustrated in FIG. 3, showing the manner in which constant time synchronization between the 90 cycle and 150 cycle signals is preserved. The waveforms of FIG. 3 are not to any particular scale as to amplitude or time. The substantially sine wave signal produced at the collector of transistor Q1 is illustrated at D in FIG. 3, which is transformed into a substantially rectangular or square wave at the collector of transistor Q3, the differentiated version of which occurring at the junction between capacitor C5 and resistor R12 is illustrated by wave form E. The diode D1 blocks the negative pulses in the waveform E and produces the train of sharpened positive pulses illustrated by the waveform F, which are applied to both the 90 cycle oscillator 13 and the 150 cycle oscillator 14. As is indicated in FIG. 3, the pulses of the waveform F occur at appropriate points near the peak of every third cycle of the oscillations produced by 90 cycle oscillator 13 and every fifth cycle of the oscillations of 150 cycle oscillator 14, the waveforms at the points G and H indicated in FIG. 2A being designated G and H in FIG. 3. The resultant sine wave outputs from the two oscillators 13 and 14, as previously described, are applied to the opposite ends of the attenuating network formed by resistors R26 to R30, providing a stronger 150 cycle signal on the conductor leaving junction A, a stronger 90 cycle signal on the conductor leaving junciton C, and a bananced signal on the conductor leaving junction B. These are selectively applied to the audio amplifier, modulator and RF oscillator as previously described by the control of the switching diodes D2, D3 and D4 to produce the desired test signals at the RF output.

Representative values for the circuit components of the schematic circuit illustrated in FIGS. 2A and 2B for a satisfactory embodiment of the circuit are given in the following table:

| | | | | | |
|---|---|---|---|---|---|
| C1 | .22 Mfd. | 100 V. | R1 | 47,000 Ohm | 1/4 W |
| C2 | .22 Mfd. | 100 V. | R2 | 47,000 Ohm | 1/4 W |
| C3 | .47 Mfd. | 15 V. | R3 | 2,000 Ohm | 1/4 W |
| C4 | 270 Pf. | 1,000 V. | R4 | 5,000 Ohm | |
| C5 | .01 Mfd. | 50 V. | R5 | 10,000 Ohm | 1/4 W |
| C6 | .047 Mfd. | 100 V. | R6 | 33,000 Ohm | 1/4 W |
| C7 | .047 Mfd. | 100 V. | R7 | 6,200 Ohm | 1/4 W |
| C8 | .1 Mfd. | 35 V. | R8 | 6,800 Ohm | 1/4 W |
| C9 | .068 Mfd. | 100 V. | R9 | 22,000 Ohm | 1/4 W |
| C10 | .068 Mfd. | 100 V. | R10 | 6,200 Ohm | 1/4 W |
| C11 | .15 Mfd. | 35 V. | R11 | 470 | 1/4 W |
| C12 | .47 Mfd. | 15 V. | R12 | 470,000 Ohm | 1/4 W |
| C13 | .47 Mfd. | 15 V. | R13 | 470,000 Ohm | 1/4 W |
| C14 | .47 Mfd. | 15 V. | R14 | 120,000 Ohm | 1/4 W |
| C15 | 1 Mfd. | 10 V. | R15 | 120,000 Ohm | 1/4 W |
| C16 | 1 Mfd. | 10 V | R16 | 22,000 Ohm | 1/4 W |
| C17 | 47 Pf. | 1,000 V. | R17 | 36,000 Ohm | 1/4 W |
| C18 | .001 Mfd. | 1,000 V. | R18 | 36,000 Ohm | 1/4 W |
| C19 | 4.7 Pf. | 1,000 V. | R19 | 3,000 Ohm | 1/4 W |
| C20 | 33 Pf. | 1,000 V. | R20 | 5,000 Ohm | |
| C21 | 47 Pf. | 1,000 V. | R21 | 22,000 Ohm | 1/4 W |
| C22 | 100 Mfd. | 12 V. | R22 | 36,000 Ohm | 1/4 W |
| | | | R23 | 36,000 Ohm | |
| D1 | 1N4001 | 50 PIV | R24 | 4,700 Ohm | 1/4 W |
| D2 | 1N4001 | 50 PIV | R25 | 5,000 Ohm | 1/4 W |
| D3 | 1N4001 | 50 PIV | R26 | 150,000 Ohm | 1/4 W |
| D4 | 1N4001 | 50 PIV | R27 | 10,000 Ohm | 1/4 W |
| D5 | 1N4001 | 50 PIV | R28 | 10,000 Ohm | 1/4 W |
| D6 | 1N4001 | 50 PIV | R29 | 120,000 Ohm | 1/4 W |
| D7 | 1N4001 | 50 PIV | R30 | 50,000 Ohm | |
| D8 | 7.5 V 10% | 1 W Zener Diode | | 100,000 Ohm | 1/4 W |
| | | | R32 | 100,000 Ohm | 1/4 W |
| L1 | Coil | 8-3/4 turns tight wound 26 enamel covered wire taped 1-1/2 turns from the bottom and wound on a 3/16 inch form | | | 1/4 W |
| | | | R34 | 10,000 Ohm | 1/4 W |
| | | | R35 | 10,000 Ohm | 1/4 W |
| | | 36 | 10,000 Ohm | 1/4 W |
| | | 37 | 1,500,000 Ohm | 1/4 W |
| | | R38 | 1,500,000 Ohm | 1/4 W |
| L2 | 8.2 μH | Choke | R39 | 100,000 Ohm | 1/4 W |
| | | | R40 | 10,000 Ohm | 1/4 W |
| Q1 | 2N3390 | NPN | R41 | 10,000 Ohm | |
| Q2 | 2N2712 | NPN | R42 | 100,000 Ohm | 1/4 W |
| Q3 | 2N2712 | NPN | R43 | 470 Ohm | 1/4 W |
| Q4 | 2N3390 | NPN | R44 | 100,000 Ohm | 1/4 W |
| Q5 | 2N3390 | NPN | R45 | 3.3 Ohm-BWH | 1 W |
| Q6 | 2N2712 | NPN | R46 | 150 Ohm | 1 W |
| Q7 | 2N3390 | NPN | R47 | 150 Ohm | 1 W |
| Q8 | 2N5179 | NPN | R33 | 100,000 Ohm | 1/4 W |
| | | Xtal | 108.100 Mhz | | 1th Overtone |

The previously described circuit principals can be used to develop, in addition to I. L. S. localizer signals, I. L. S. glide slope signals with only minor modifications. Either the crystal and RS values can be changed to operate on the glide slope frequencies, or a frequency multiplying stage added following the RF oscillator may be provided which would be modulated with the locked audio components.

Figure 4:
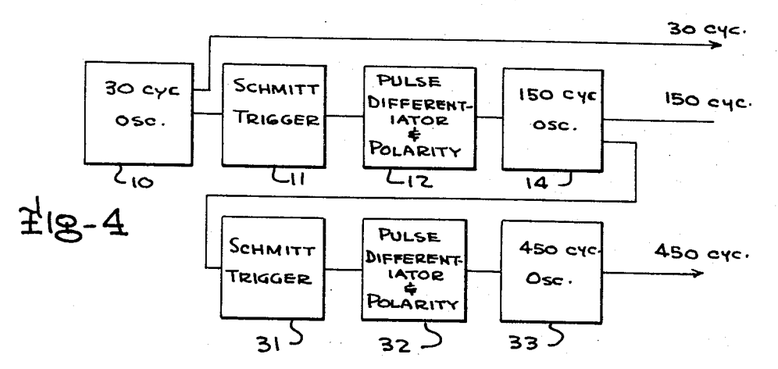
FIG. 4 is a block diagram of an alternate form of apparatus for producing frequency and phase locked sine waves of three selected frequencies using free running "T" oscillators.

Outside the field of avionics, the locked audio signals may be useful in musical instruments where special notes are required to have proportional frequency relationships. Not only could the master oscillator drive several oscillators producing the desired final frequencies, but also one of the locked oscillators could be used to provide the necessary signals to drive other "T" oscillators by generating a locking pulse. An example of such a circuit is illustrated in block diagram form in FIG. 4, which produces a 30 cycle signal, a 150 cycle signal, and a 450 cycle signal. In this example, wherein stages corresponding to stages of the first described embodiment are given the same reference characters, a 150 cycle free running "T" oscillator 14 is locked to the 30 master oscillator 10 in the same manner as in the first described embodiment, through the intervening Schmitt trigger 11 and pulse differentiating and polarity stage 12. A 150 cycle output from the oscillator 14 is then translated into a square wave by another Schmitt trigger stage 31 and a pulse differentiating and polarity selection circuit 32 similar to the corresponding circuits 11 and 12 of the FIG. 1 embodiment and this locking pulse is applied to a 450 cycle per second free running "T" oscillator 33 to synchronize the oscillator 33 by the trigger pulses delivered at the output of stage 32 in the same manner as the "T" oscillator 14 was synchronized. Thus a 30 cycle signal, a 150 cycle signal, and a 450 cycle signal are produced all of which will maintain substantially the same frequency relationships.

Figure 5:
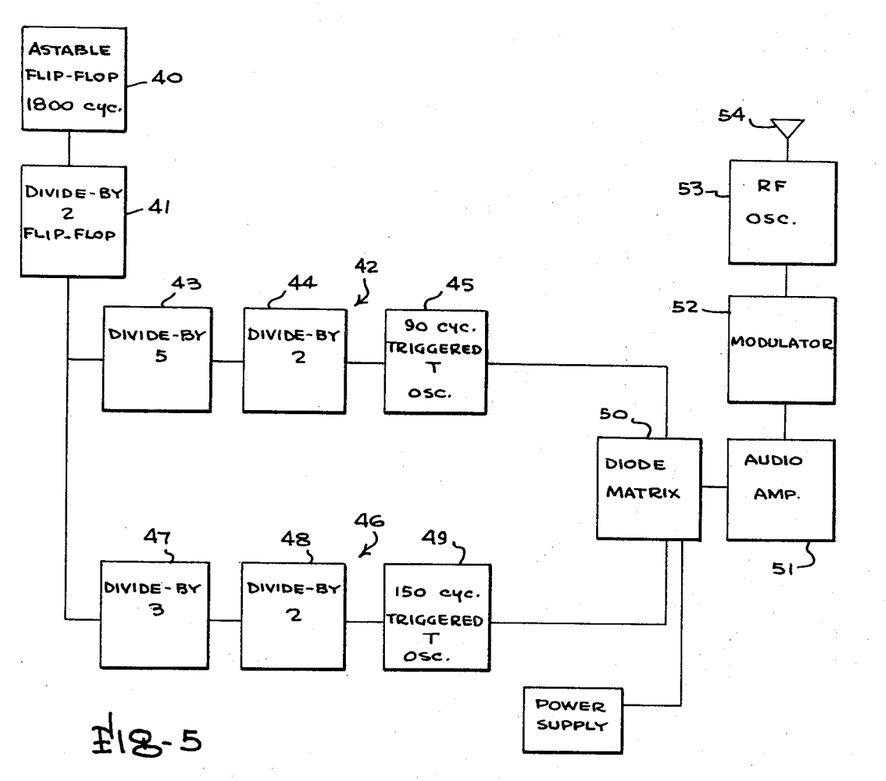
FIG. 5 is a block diagram of another form of apparatus for producing locked sine waves of two selected frequencies using a higher common frequency and triggered (not free running) "T" oscillators.

Another variation is illustrated in FIG. 5 for providing test signals for aircraft I. L. S. navigation systems requiring for example a 90 cycle and a 150 cycle signal having a constant time relationship. In the circuit of FIG. 5, a higher common frequency signal is provided, which in this example may be produced by an astable flip-flop circuit 40 having an 1,800 cycle per second frequency whose output is divided down by a divide-by-2 flip-flop 41, producing a 900 cycle square wave. This 900 cycle square wave is divided in a first channel generally indicated at 42 by a divide-by-5 stage 43 and then by a divide-by-2 stage 44, thus reducing the original square wave to a 90 cycle square wave. This 90 cycle square wave is then fed into a triggered "T" oscillator which has a resonant frequency of 90 cycles. Due to the fact that the amount of attenuation in the "T" phase bridge is greater than the amount of gain or amplification in the active components, no output signal is present unless the input signal of the same or nearly the same resonant frequency to the "T" bridge is injected into the active components.

The 900 cycle square wave from the flip-flop 41 is also applied to a channel 46 comprising a divide-by-3 flip-flop 47 and a divide-by-2 flip-flop 48 to produce a 150 cycle square wave which is applied to a triggered "T" oscillator 49 having a resonant frequency of 150 cycles, which is driven in substantially the same manner as the 90 cycle triggered "T" oscillator 45 to produce a high quality 150 cycle sine wave output. The outputs from the two triggered "T" oscillators 45 and 49 are applied through a diode matrix switch and attenuator network stage 50 similar to the stage 15 of FIG. 1, and the output from that stage is applied through audio amplifier 51, modulator 52 and RF oscillator 53 to produce the radiated signals from antenna 54 in a similar manner to the corresponding components of the FIG. 1 embodiment.

Figure 6:
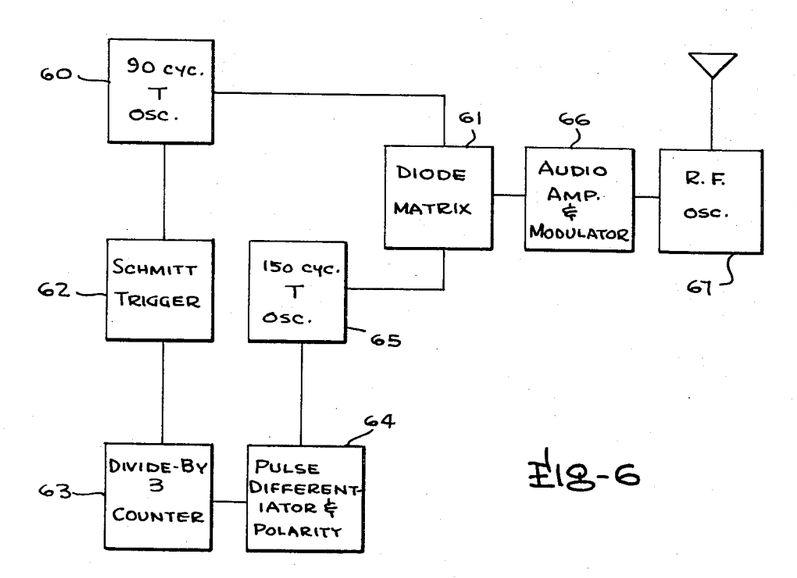
FIG. 6 is a block diagram of yet another form of apparatus for producing frequency locked sine waves.

Yet another apparatus for developing frequency and phase locked sine waves using "T" oscillators as illustrated in FIG. 6. In this arrangement, a 90 cycle "T" oscillator 60 provides a first output to the diode matrix 61, and also drives a Schmitt trigger 62. The output of the Schmitt trigger is used to drive a frequency divider 63, which in this case is a divide-by-3 counter providing a thirty cycle signal which is applied to the pulse differentiator and polarity stage 64 to transform the square wave type of pulse to a sharp peaked pulse. The peaked pulse is polarized and the resultant pulse is used to lock the free running "T" oscillator 65 which has a resonant frequency of 150 cycles per second, the output of which is also applied to the diode matrix 61. The output of the diode matrix 61 is applied to an audio amplifier 66 and RF oscillator 67 in the same manner as in the preceding embodiments.

What is claimed is:

1. Apparatus for producing output test signals for testing aircraft instrument landing system navigation equipment wherein first and second substantially sine wave signals of selected first and second frequencies locked in precise timed relation to each other are produced, the apparatus comprising first and second T oscillators respectively arranged to produce output sine wave signals at said first and second frequencies, a single master oscillator for producing a master synchronizing signal having a frequency bearing a predetermined phase and harmonic frequency relationship to each of said first and second frequencies, pulse forming means connected to the output of said oscillator to produce one sharp positive pulse and negative pulse for each cycle of the master synchronizing signal and including means for eliminating the pulses of one selected polarity to provide output pulses of the other selected polarity only, means for applying said output synchronizing pulses to each of said T oscillators, said T oscillators having means responsive to said applied pulses for regulating the frequency of its output signals, and means for applying said pulses to said T oscillators for maintaining the output signals of the latter in selected frequency and phase relationship to the master synchronizing signal and to each other, an attenuating network across which the first and second sine wave signals are applied at opposite ends and having output taps from said attenuating network providing a balanced center output wherein the first and second signals are of equal amplitude and providing second and third outputs wherein the amplitudes of the first and second singals respectively are of relatively greater value, an output stage including radio frequency oscillator means for producing radio frequency oscillations and radiating them as output test signals to be received by the navigation equipment for testing the latter, modulator means coupled to said radio frequency oscillator means for modulating the radio frequency oscillations, and a switching network coupled between the modulator means and said attenuating network for selectively controlling with said attenuating network the relative amounts of said first and second sine wave signals to be applied to said modulating means for modulating the radio frequency oscillations to produce the output test signals.

2. Apparatus for producing output test signals for testing aircraft instrument landing system navigation equipment, as defined in claim 1, wherein said pulse forming means comprises a Schmitt trigger stage receiving signals of a first frequency for producing a square wave signal, pulse shaping means receiving said square wave signal for producing a train of pulses of alternating polarity from said square wave and means for eliminating the pulses of one selected polarity to produce a trigger pulse train from the pulses of the other polarity for application to said second T oscillator to maintain the same in selected frequency and phase relationship to the signals generated by said first T oscillator.

3. Apparatus for producing output test signals for testing aircraft instruments landing system navigation equipment wherein first and second substantially sine wave signals of selected first and second frequencies locked in precise timed relation to each other are produced, the apparatus comprising first and second T oscillators respectively arranged to produce output sine wave signals at said first and second frequencies, a master oscillator for producing a master sine wave signal having a frequency which is a common sub-multiple of said first and second frequencies, signal shaping means connected to the output of said oscillator for transforming said master signal into a train of sharpened trigger pulses having a pulse repetition rate corresponding to the frequency of the master signal, said signal shaping means comprising a Schmitt trigger receiving said master sine wave signal from said master oscillator and producing a square wave signal having the same frequency as the master signal, and pulse differentiating and polarity determining means including a pulse differentiator for producing sharpened pulses of alternating frequency from the leading edges of said square wave signal and diode means for eliminating the pulses of one selected polarity to produce a train of trigger pulses for application to said first and second T oscillators, means for applying the trigger pulses to said first and second T oscillators for continuously locking the same in selected frequency and phase relationship to said master signal and to each other, an attenuating network across which the first and second sine wave signals are applied at opposite ends and having output taps from said attenuating network providing a balanced center output wherein the first and second signals are of equal amplitude and providing second and third outputs wherein the amplitudes of the first and second signals respectively are of relatively greater value, an output stage including radio frequency oscillator means for producing radio frequency oscillations and radiating them as output test signals to be received by the navigation equipment for testing the latter, modulator means coupled to said radio frequency oscillator means for modulating the radio frequency oscillations and a switching network coupled between the modulator means and said attenuating network for selectively controlling with said attenuating network the relative amounts of said first and second sine wave signals to be applied to said modulating means for modulating the radio frequency oscillations to produce the output test signals.

4. Apparatus for producing output test signals for testing aircraft instrument landing system navigation equipment wherein first and second substantially sine wave signals of selected first and second frequencies locked in precise timed relation to each other are produced, the apparatus comprising first and second T oscillators respectively arranged to produce output sine wave signals at said first and second frequencies, master oscillator means for producing a common oscillating signal of higher frequency than said first and second signals of which the latter are sub-multiples, first channel means for dividing said common oscillating signal to produce a first divided oscillating control signal of said first frequency for application to said first T oscillator, second channel means for dividing said common oscillating signal by a different factor to produce a second divided oscillating control signal of said second frequency for application to said second T oscillator, said first and second divided oscillating control signals collectively maintaining said T oscillators in selected frequency and phase relationship to each other, an attenuating network across which the first and second sine wave signals are applied at opposite ends and having output taps from said attenuating network providing a balanced center output wherein the first and second signals are of equal amplitude and providing second and third outputs wherein the amplitudes of the first and second signals respectively are of relatively greater value, an output stage including radio frequency oscillator means for producing radio frequency oscillations and radiating them as output test signals to be received by the navigation equipment for testing the latter, modulator means coupled to said radio frequency oscillator means for modulating the radio frequency oscillations, and a switching network coupled between the modulator means and said attenuating network for selectively controlling with said attenuating network the relative amounts of said first and second sine wave signals to be applied to said modulating means for modulating the radio frequency oscillations to produce the output test signals.

5. Apparatus for producing output test signals for testing aircraft instrument landing system navigation equipment, as defined in claim 4, wherein said means for producing said common oscillating signal is a flip-flop circuit producing the square wave output signal whose frequency bears selected multiple relationships common to said first and second frequencies, the apparatus also including divider flip-flop means receiving the square wave output signal from said first mentioned flip-flop for producing a control square wave signal whose frequency also bears a multiple relationship to each of said first and second frequencies, and said first and second channel means including divider circuits for dividing said control square wave signal for producing first and second divided square wave signals of said first and second frequencies for application to said first and second T oscillators for maintaining said T oscillators in pre-determined phase and frequency relationship to each other.

6. Apparatus for producing output test signals for testing aircraft instrument landing system navigation equipment, as defined in claim 4, wherein said signal shaping means includes a schmitt trigger receiving said master sine wave signal from said master oscillator and producing a square wave signal having the same frequency as the master signal, and pulse differentiating and polarity determining means including a pulse differentiator for producing sharpened pulses of alternating frequency from the leading edges of said square wave signal and diode means for eliminating the pulses of one selected polarity to produce a train of trigger pulses for application to said first and second T oscillators.

* * * * *

UNITED STATES PATENT OFFICE
CERTIFICATE OF CORRECTION

Patent No. 3,805,588      Dated April 23, 1974

Inventor(s) NEIL STONE

It is certified that error appears in the above-identified patent and that said Letters Patent are hereby corrected as shown below:

Column 6, line 33, "RS" should read -- RC --, and at line 52, before "master" insert --cycle--.

Signed and sealed this 19th day of November 1974.

(SEAL)
Attest:

McCOY M. GIBSON JR.        C. MARSHALL DANN
Attesting Officer          Commissioner of Patents